March 16, 1965 A. W. MASSMAN 3,174,074

TRANSISTORIZED DEFLECTION SYSTEM FOR FLAT-FACED KINESCOPE

Filed May 8, 1961

INVENTOR.
Albert W. Massman.
BY Mueller & Aichele
ATTYS.

United States Patent Office 3,174,074
Patented Mar. 16, 1965

3,174,074
TRANSISTORIZED DEFLECTION SYSTEM FOR FLAT-FACED KINESCOPE

Albert W. Massman, Wheaton, Ill., assignor to Motorola, Inc., Chicago, Ill., a corporation of Illinois Filed May 8, 1961, Ser. No. 108,378
5 Claims. (Cl. 315—27)

Figures 1, 2:
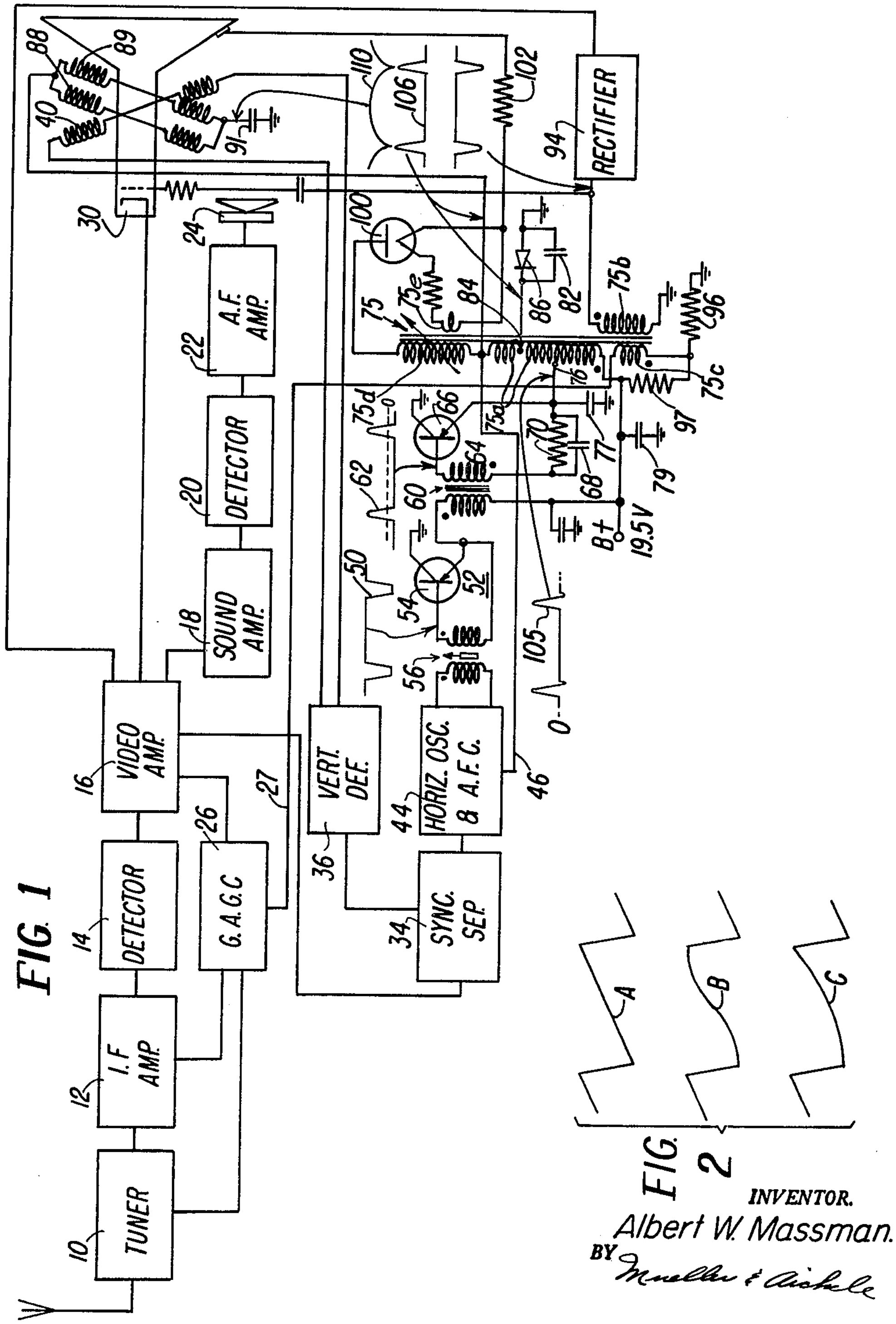

This invention relates to transistorized television receivers and more particularly to an improved line deflection system employing semiconductors.

In utilizing transistors in the line or horizontal deflection system for a television receiver, some of the circuit design and operation can follow the same principles found in corresponding vacuum tube circuits in horizontal deflection systems. However, in certain respects a departure from previously known vacuum tube circuitry can result in the improvement of circuit performance and reduction of television receiver cost.

Since some transistors can operate as very effective switches, it is possible to develop a precise sawtooth deflection current in the deflection yoke for a cathode ray picture tube. However, many of the present day cathode ray tubes have a relatively flat screen and a wide angle of deflection, so that sweeping the beam by a straight line sawtooth current would introduce nonlinearities in a reproduced image. Such nonlinearities would be manifested as a horizontal expansion at the sides of the screen because of the greater beam travel in reaching the sides than in reaching the screen center. Correction for such a nonlinearity is therefore desirable and it is an object of the present invention to overcome this problem and to improve the linearity of the horizontal deflection system in a transistorized television receiver.

Another object is to provide a transistorized deflection circuit which furnishes linear horizontal sweep signals for a flat faced cathode ray tube by means of simple and inexpensive circuitry.

While it has been recognized in the past that a transistor can be operated both in forward conduction as a switch for an associated horizontal deflection inductor to produce a sawtooth deflection current, and in reverse conduction as a damper diode to restrict retrace ringing, presently available transistors do not give fully satisfactory results when so operated. Accordingly, a separate damper diode is still generally necessary. However, suitable damper diodes are costly and the usual attempts to reduce the cost of the damper circuit have also been associated with degraded performance, for example, in the form of non-linear horizontal sweep signals.

Therefore, a further object of the invention is to maintain fully satisfactory linearity in horizontal deflection signals while at the same time permitting the use of a low cost damper diode having desirable electrical properties.

A feature of the invention is the provision of a semiconductor damper diode connected to a selected tap of a horizontal deflection inductor to compensate for the potential conduction characteristic of the diode as compared to the conduction characteristic of the switching transistor in the deflection system.

Another feature is the provision of a linearity improving circuit for a transistorized deflection system operative with a flat faced cathode ray tube and including a reasonated deflection yoke series tuned to substantially one-half of the line deflection frequency for expanding the center portion of the sweep signal and compressing the edge portions of the sweep signal.

In the drawing:

FIG. 1 is a diagram of a transistorized television receiver partly in block form and partly in schematic form illustrating the invention; and FIG. 2 is a series of curves useful in explaning the operation of the circuit of the invention.

Referring now to FIG. 1, the illustrated television receiver, which may be battery operated and all transistorized except for the picture tube and the high voltage rectifier, includes a turner 10 which selects signals from an associated antenna to convert a received signal to a fixed frequency for further selection and amplification in the IF amplifier 12. Amplifier 12 is copuled to the detector 14 which demodulates a received composite video signal having line and frame synchronizing components, video frequency components, and a modulated sound carrier. The demodulated television signal is applied to the video amplifier 16 and this circuit provides the sound subcarrier which is coupled to the sound amplifier 18. The sound signal is then applied to a sound detector 20 and the demodulated sound signal is amplified in the audio frequency amplifier 22 in order to drive the loudspeaker 24. The demodulated television signal is also applied through a direct current circuit from the detector 14 and through the video amplifier 16 to the gated automatic gain control circuit 26. Circuit 26 is gated by means of pulses occurring at the line or horizontal deflection frequency applied thereto over lead 27. A control potential developed by circuit 26 and having a value dependent upon the strength of the received signal is applied to the tuner 10 and the IF amplifier 12 for regulating the gain thereof.

The detected and amplified video signal from the amplifier 16 are coupled to the cathode of the cathode ray picture tube 30. A video amplifier 16 is further coupled to the synchronizing signal separator circuit 34 which amplitude separates both the frame and line synchronizing signal components of the composite video signal. The frame or vertical synchronizing signal, generally of 60 cycles, is then applied to the vertical deflection circuit 36 which develops a suitable sawtooth scanning current in the vertical deflection yoke winding 40 disposed on the neck of the cathode ray tube 30.

A synchronizing signal separator circuit 34 is also connected to the line or horizontal oscillator circuit 44 which generates a scanning control signal in synchronism with the line deflection components of the received composite video signal. Circuit 44 also includes a suitable automatic frequency control system used to maintain the proper relationship between the oscillator signal and the received line deflection components. Pulse signals from the output of the horizontal deflection system are applied by way of lead 46 to the automatic frequency control portion of the circuit 44 for comparison purposes.

Circuit 44 applies a suitably synchronized signal at 15.75 kc., illustrated as a waveform 50, to the horizontal driver stage 52. Stage 52 includes a transistor 54, the base and emitter of which are coupled to the secondary winding of transformer 56. The collector of transistor 54 is grounded and the emitter thereof is connected through the primary winding of coupling transformer 60 to a source of direct current energizing potential, or B+. The voltage waveform 62 appearing in the secondary winding of transformer 60 is a series of positive going pulses occurring at a frequency of 15.75 kc., which pulses have a duration of approximately 17 microseconds.

The horizontal output stage 64 includes a transistor 66 having a base electrode connected to one side of the secondary winding of transformer 60. The other terminal of the secondary winding is connected through the coupling capacitor 68 to the emitter of transistor 66. A base bias resistor 70 is connected across the capacitor 68. The collector of transistor 66 is connected directly to ground and the emitter thereof is connected to a tap 76 of the primary winding 75*a*, of the horizontal output transformer 75. This tap point is at approximately 90 percent of the turns of the winding 75a. The capacitor 77 is connected between the emitter of transistor 66 and ground to form a "tweet" filter for harmonics of the horizontal deflection signal. The lower end terminal of the primary winding 75a is connected to a positive energizing potential source of B+, which is bypassed for signal frequencies by filter capacitor 79.

A capacitor 82 is connected from tap point 84 of primary winding 75a to ground. The tap point 84 is at approximately 93 percent of the turns of primary winding 75a. A damper diode 86 is also connected from tap point 84 to ground. The top or signal point of the primary winding 75a is directly connected to each of the horizontal yoke deflection coils 88 and 89, the other terminals of which coils are interconnected and coupled to ground through capacitor 91. The horizontal deflection yoke coils 88 and 89 are effectively connected across primary winding 75a through the capacitor 91 and the bypass capacitor 79. The primary winding therefore impedance matches the output transistor 66 to the yoke coils.

In order to provide operating potentials higher than the B+ 19.5 volt supply (here supplied by a battery) some of the energy may be derived from the horizontal output circuit 64 and applied to a suitable rectifier circuit. A further winding 75b on the horizontal output transformer 75 is connected between ground and the rectifier circuit 94. A rectified and filtered direct current potential is developed from the flyback pulses by the circuit 94 and applied to the video amplifier stage 16 in order to furnish a suitable energizing potential for a transistor amplifier in that stage. One side of winding 75b is also connected to a control grid of the cathode ray picture tube 30 in order to provide a horizontal blanking pulse for the picture tube. A further rectifier circuit may be connected across the primary winding 75a to supply a high voltage bias potential for the cathode and grid of the picture tube 30.

As previously stated, the automatic gain control circuit is of the gated type, and for this purpose a further winding 75c is inductively coupled to the primary winding 75a. One side of the winding 75c is connected to the junction of the voltage divider resistors 96 and 97 which are series connected between ground and B+. The other terminal of winding 75c is connected through lead 27 to the AGC circuit 26 for gating this circuit into operation only during reception of the horizontal synchronizing components.

It is also contemplated that the transformer 75 include a high voltage secondary winding 75d which is connected between the output terminal of the primary winding and the anode of a high voltage rectifier 100. The filament of rectifier 100 is energized by means of a winding 75e also on transformer 75. High voltage wave energy appearing in the winding 75d may therefore be rectified by the diode 100 to develop a potential for the screen of the cathode ray picture tube 30 which is connected to the filament of the rectifier 100 through limiting resistor 102.

Considering now the functioning of the horizontal output circuit 64, the system is operated to provide a sawtooth current waveform at 15.75 kc. in the yoke coils 88 and 89 for line or horizontal deflection of the beam in the picture tube 30. The transistor 66 is made conductive, in a saturated condition, through the primary winding 75a of the transformer 75 and during this time current is increasing through the primary winding and the yoke coils. The sawtooth deflection current reaches a maximum (for example, 8 amperes peak) as a positive going pulse of waveform 62 is applied to the base electrode of transistor 66 causing abrupt cutoff thereof. At this time the energy stored in the primary winding 75a and the yoke coils 88 and 89 is released and the circuit is permitted to oscillate at a frequency determined primarily by the combined inductance of these windings and the capacitance of capacitor 82. Capacitor 82 effectively tunes the flyback system to the retrace frequency and being connected across the damper diode 86 eliminates transients and ringing in the inductive elements connected to the diode 86. With the capacitor 82 connected directly across the damper diode 86, the other inductive elements in the circuit become part of the retrace ringing network and do not oscillate or ring at other spurious frequencies in an undesired relationship with the diode 86 and capacitor 82.

The tuned frequency of the winding 75a, yoke coils 88 and 89 and the capacitor 82 is of the order of 35 kc. This results in the production of a sinusoidal voltage pulse wave 105 at the emitter of transistor 66, and wave 106 at tap 84 and the end of the primary winding 75a. The emitter pulse, for example having an amplitude of 140 volts peak, is essentially one-half of the waveform of the oscillatory retrace signal and has a duration of approximately 14 microseconds. Continued ringing or oscillation of the transformer and yoke circuit is stopped by the damper diode 86 which begins to conduct during the second half of the ringing waveform. At this time the stored energy in the primary winding 75a and yoke coils 88, 89 is returned to the B+ potential supply, which, in the situation being described, may be a battery.

Damper diode 86 remains conductive after the termination of the synchronizing drive pulses 62, each of which may have a duration of about 17 microseconds. These are therefore about three microseconds longer in duration than the retrace pulses 105. Conduction of diode 86 applies the initial deflection producing current flow in the primary winding 75a. At almost the same time, reverse current flows in the collector circuit of transistor 66 which also provides damping action and mutual deflection current. The damper diode conduction occurs for only a portion of the scanning or trace portion of the cycle, however, and after about 16 microseconds of the 48 second scanning cycle, diode 86 is cut off and energy is supplied by the B+ source and then the forward conduction of transistor 66 supplies current to primary winding 75a for the remainder of the scanning period. Accordingly, transistor 66 is cut off during the flyback or retrace time (approximately 14 microseconds) and is reverse conductive for the initial portion of the trace time, and is driven into saturation and forward conduction during the latter portion of the trace time. The damper diode 86 is rendered conductive at the end of the retrace pulses 105 and during the initial portion of the trace or scanning signal.

It will be appreciated that a transistor such as transistor 66, may to some degree, perform the function of the damper diode. However, it is preferable to utilize a separate damper diode to establish the start of the scan or trace portion of the signal since the transistor may not switch sufficiently fast and may have undesirable resistance in the reverse conduction condition. Furthermore, without a separate damper diode it would be necessary to establish precise timing of the finish of the retrace pulses 105 with the finish of the synchronizing trigger signals 62 in order that the system operate efficiently without driving the transistor 66 into conduction either before or after the finish of the retrace pulse 105. In the system being described, the damper diode 86 becomes conductive as one-half of a retrace oscillatory signal is completed and this is the start of the scanning signal when energy may be restored to the B+ potential supply and the system is operative in its most efficient manner. It may be noted that while the triggering signals 62 will last for approximately 3 microseconds beyond the end of the retrace signal 105, the damper diode will be effective to suppress any tendency for oscillation at such time.

In the present state of development of transistors, the horizontal output transistor 66 may be a germanium type and thus a germanium damper diode could be connected directly to the tap 76 of the primary winding 75a in order to obtain linear operation of the deflection system. However, it can be appreciated that a germanium diode may cost several times as much as a silicon diode and that a germanium diode may not have as desirable a voltage breakdown characteristic as would a silicon diode. Accordingly, the present system contemplates that diode 86 be of a silicon type to take advantage of the lower cost and improved breakdown characteristics for diodes of this type.

Since diode 86 is of a silicon type its work function will not be the same as that of the transistor 66 when in conduction. That is, where a germanium diode connected to the tap 76 might commence conduction with .2 of a volt across its electrodes, a silicon diode may not conduct until as much as .7 of a volt is impressed across its electrodes. (To compensate for this difference in conduction characteristics between the transistor 66 and the damper diode 86, the damper diode is connected to a tap 84 which effectively provides a compensating higher portion of the D.C. energizing potential for the transformer and yoke to the damper diode than is applied to the emitter-collector of the transistor. The tap 84 is chosen so that the conduction potential across the diode matches the conduction potential across transistor 66 and a constant potential is applied to the transformer winding 75*a* from the time the diode 86 is rendered conductive, through the period of reverse conduction of the transistor 76 and through the period in which transistor 66 is forward conductive.)

It will be understood that the application of a constant potential to the winding 75*a* is necessary in order to maintain linearity of beam scanning by the deflection current applied to the yoke windings 88 and 89. For example, if the diode 86 were not connected to a properly matched tap point of winding 75*a* with respect to the point to which transistor 66 is connected, then a fraction of a volt change in the potential applied to winding 75*a* as the diode 86 stops conduction and the transistor 66 suppliies the full deflection current would be observed as a point of change in deflection linearity at this portion of the cycle. The presently described circuit overcomes the problem of this form of non-linearity in the deflection system and the operation of the circuit is such that it has the advantages of one incorporating a more expensive damper diode while at the same time the system may be constructed at reduced cost and may display improved voltage breakdown characteristics across the damper diode.

While the above described system tends to produce a linear sawtooth current wave as depicted by curve A in FIG. 2, such energization of the yoke coils 88 and 89 may be undesirable under some circumstances. For example, in the case of flat face, wide deflection cathode ray tubes, unit deflection of the beam across the central portion of the screen will be considerably less than a corresponding deflection at either side of the screen since the beam travels a considerably greater distance in reaching the screen sides than in reaching the screen center when the tube face is flat and not round. Such non-linear deflection can result in deflection of .6 of an inch at the center of the screen being rendered as one inch of deflection at either edge of the screen.

In order to effectively expand the deflection along the central portion of the deflection signal and compress the beginning and end portions of the deflection signals, the yoke coils 88 and 89 are tuned to approximately one-half the horizontal deflection frequency by means of the capacitor 91. Accordingly, the yoke coils for the horizontal deflection system are series resonated with capacitor 91 at approximately 8 kilocycles. The voltage waveform appearing across capacitor 91 is parabolic as shown by waveform 110. However, resonance of the yoke circuit introduces a component of current which is sinusoidal and which is one-half of a sine wave since the resonant circuit is tuned to one-half of the horizontal deflection frequency. This results in a composite deflection current through the yoke coils 88 and 89 which is S shaped as shown in curve B of FIG. 2. In curve B it may be noted that the central portion of the scanning wave is somewhat steeper whereas the beginning and end portions of the scanning wave are flattened to reduce the amount of deflection to compensate for the increased beam travel in impinging upon a flat face cathode ray tube.

The transistor deflection circuit is particularly adaptable to yoke tuning for compensation of a sawtooth signal because the problem of "cross-over," that is the time when the damper diode ceases conduction and the output electron valve commences conduction, is not a problem with transistors as it is with tubes. In other words, a transistor can be conductive in forward and reverse directions and therefore conductive substantially throughout the scanning cycle. In a vacuum tube deflection circuit, the damper diode exclusively supplies the current during the initial portion of the scanning wave and the tube exclusively supplies the current during the latter portion of the scanning wave. Furthermore, it should be recognized that in vacuum tube circuits the usual sawtooth scanning current is as depicted in curve C of FIG. 2. In other words, the waveform produces compression at the initial portion of the scan and expansion at the latter portion of the scan. This is to be contrasted with the nearly uniform standing current shown in curve A as produced by the transistor. It is pointed out that the incorporation of the resonant modifying current as utilized to form curve B would only tend to further compress the initial portion of the scanning current waveform C in the case of a vacuum tube deflection system.

In a practical construction of the circuit of FIG. 1, circuit components were as follows:

| | |
|---|---|
| Transistor 66 | 4459 (Motorola). |
| Capacitor 68 | 500 microfarads. |
| Resistor 70 | 2.7 ohms. |
| Transformer winding 75*a* | 57 turns No. 18 wire tapped at 51 and 53 turns supported on a rectangular core of powdered iron 17/32 inch in diameter with variable gap spacing between two of the core legs. |
| Capacitor 77 | .02 microfarad. |
| Capacitor 82 | .2 microfarad. |
| Diode 86 | 4460 (Motorola). |
| Yoke coils 88, 89 | 97 microhenries. |
| Capacitor 91 | 6.5 microfarads. |

The above described invention provides therefore an improved line deflection system utilizing semiconductor devices. It is emphasized that the system is constructed in a manner to provide improved results at reduced cost. It is also noteworthy that the system furnishes a linear line deflection signal which can be compensated for flat faced, wide deflection picture tubes. Furthermore, the system is constructed in a manner to operate efficiently and to conserve energy in the horizontal deflection system to permit more effective operation from a battery source of power.

I claim:

1. In a deflection system providing a deflection signal with trace and retrace portions for a cathode ray tube, said system including in combination, a switching transistor, means for supplying pulses to said transistor with a polarity to cut off said transistor for the retrace portion of the signal, direct current power supply means, deflection winding means connected in a conductive circuit with said transistor and said power supply means so that said transistor is conductive initially in a reverse direction and subsequently in a forward direction during the trace portion for developing a sawtooth deflection current in said winding means and so that said winding means may ring on the retrace portion, a damping diode composed of a different semiconductor material than that of said transistor, means connecting said diode to a reference point of said power supply means and to a turn of said winding means removed from the connection thereof to said transistor whereby said diode conducts during an initial part, but not a subsequent part, of the trace portion of the deflection signal, said diode being poled to prevent more than one-half cycle of ringing by said winding means, said turn being selected to provide a compensating voltage to said diode during conduction thereof to match the conduction voltage characteristic of said transistor.

2. In a line deflection system providing a deflection signal with trace and retrace portions for a cathode ray tube, said system including in combination, a germanium switching transistor, means for supplying pulses to said transistor with a polarity to cut off said transistor for the retrace portion of the signal, direct current power supply means, deflection winding means connected in a conductive circuit with said transistor and said power supply so that said transistor is forward conductive during a latter part of the trace portion for developing a sawtooth deflection current in said winding means and so that said winding means may ring on the retrace portion of the signal, a silicon damping diode, means connecting said diode between said power supply means and a tap of said winding means removed from the connection thereof to said transistor so said diode conducts through said winding means during an initial part, but not a subsequent part, of the trace portion, said tap being selected to provide a compensating voltage to said diode during conduction thereof to match the conduction voltage of said transistor.

3. In a line deflection system to provide a deflection signal with trace and retrace portions for a cathode ray tube, said system including in combination, a germanium switching transistor having base, emitter and collector electrodes, means for supplying pulse signals between said base and emitter electrodes with a polarity to cut off said transistor for the retrace portion of the signal, direct current power supply means, a transformer winding, means connecting said power supply means, said emitter and collector electrodes and a portion of said winding in a series circuit so that said transistor is conductive through said winding initially in a reverse direction and subsequently in a forward direction during the trace portion of the signal, a silicon damping diode, means connecting said diode across a portion of said winding greater than but including said first named portion thereof whereby said diode conducts during an initial part and is nonconductive during a latter part of the trace portion of the deflection signal, and a deflection yoke connected to said transformer winding and adapted to be positioned on the cathode ray tube.

4. In a line deflection system to provide a deflection signal with trace and retrace portions for a cathode ray tube, said system including in combination, a switching transistor having base, emitter and collector electrodes, means for supplying synchronizing pulse signals between said base and emitter electrodes with a polarity to cut off said transistor for the retrace portion of the signal, direct current power supply means, a transformer winding, means connecting said power supply means, said emitter and collector electrodes and a first portion of said winding in a series circuit so that said transistor is conductive through said winding initially in a reverse direction and subsequently in a forward direction during the trace portion of the signal, means including said winding for sustaining oscillation in said winding upon cut off of said transistor, a damping diode composed of a different semiconductor material than that of said transistor, means connecting said diode across a second portion of said winding greater than but including said first portion thereof so that diode is conductive during a portion of the oscillation in said winding and during an initial part but not a latter part of the trace portion of the deflection signal, said second portion of said winding being selected with respect to said first portion to apply a substantially constant potential to said winding throughout the trace portion of the signal, and a deflection yoke connected to said transformer winding and adapted to be positioned on the cathode ray tube.

5. In a deflection system providing a deflection signal with trace and retrace portions for a cathode ray tube, said system including in combination, a switching transistor, means for supplying pulses to said transistor with a polarity to cut off said transistor for the retrace portion of the signal, direct current power supply means, a transformer winding connected in a conductive circuit with said transistor and said power supply means, a deflection yoke connected to said winding so that said transistor is forward conductive during a latter part of the trace portion for developing a sawtooth deflection current in said yoke and said yoke and winding may ring on the retrace portion, a damping diode composed of a different semiconductor material than that of said transistor, means connecting said diode to said power supply means and to a tap of said winding removed from the connection thereof to said transistor, said diode being poled to prevent more than one-half cycle of ringing by said yoke and winding and said diode conducting during an initial part but not a latter part of the trace portion of the deflection signal, said tap being selected to provide a compensating voltage to said diode during conduction thereof to match the conduction voltage characteristic of said transistor, and means connected in circuit with said yoke to tune the same to substantially one-half the frequency of the deflection signal.

References Cited in the file of this patent

UNITED STATES PATENTS

| | | |
|---|---|---|
| 2,817,788 | Landon et al. | Dec. 24, 1957 |
| 2,896,114 | Maloff | July 21, 1959 |
| 2,896,115 | Guggi | July 21, 1959 |
| 2,905,856 | Schlesinger | Sept. 22, 1959 |
| 2,933,642 | Marley | Apr. 19, 1960 |